(12) United States Patent
Hsiao

(10) Patent No.: US 6,302,629 B1
(45) Date of Patent: Oct. 16, 2001

(54) ANTI-LOOSENING FASTENER

(75) Inventor: Ya-Tsun Hsiao, Kaohsiung (TW)

(73) Assignee: National Aerospace Fasteners Corp., Tao Yuan Hsien (TW)

( * ) Notice: Subject to any disclaimer, the term of this patent is extended or adjusted under 35 U.S.C. 154(b) by 0 days.

(21) Appl. No.: 09/585,608

(22) Filed: Jun. 2, 2000

(51) Int. Cl.$^7$ ............................ F16B 39/28; F16B 39/282
(52) U.S. Cl. ............................ 411/187; 411/161; 411/399
(58) Field of Search .................................... 411/185, 186, 411/187, 188, 160, 161, 399

(56) References Cited

U.S. PATENT DOCUMENTS

| | | | |
|---|---|---|---|
| 2,112,494 | * 3/1938 | Olson | 411/187 |
| 2,128,757 | * 8/1938 | Olson | 411/187 |
| 4,220,188 | * 9/1980 | McMurray | 411/188 |
| 5,356,253 | * 10/1994 | Whitesell | 411/399 X |

* cited by examiner

Primary Examiner—Neill Wilson
(74) Attorney, Agent, or Firm—Rosenberg, Klein & Lee

(57) ABSTRACT

The present invention is disclose a metal screw for attaching two thin panels together, such as an anti-loose fastener for joining metal panels. It comprises plurality of relatively small integral tapered angle blocks on underside of the head of the fastener spaced from one another by substantially planar uninterrupted portions of said head and projecting axially therefrom for engaging workpiece. And, the tapered angle block can generate counter stresses which can absorb any ways of torque; namely, be suitable for working in direction instability high frequency vibration environment, and won't loose.

4 Claims, 6 Drawing Sheets

ANTI-LOOSENING FASTENER

BACKGROUND OF THE INVENTION

1. Field of the Invention

This invention relates generally to an anti-loosening fastener for joining metal panels. Specifically, the invention is directed to a sheet metal screw for attaching two thin panels together, which screw exhibits an increased stripping torque over those of the prior art.

2. Description of the Prior Art

With presently available sheet metal screw, the range between drive torque and strip torque is unacceptably small. For this reason, it is virtually impossible, given dimensional tolerances and variances in material, to find a single torque setting on power screwdrivers that will drive the hardest-to-drive screw without stripping the easiest-to-drive screw. Such a situation results in a relatively high number of screws being stripped during installation, leading to reduced clamping force between two metal panels being joined or secured together, or requires substantial operator time for removal and replacement of stripped screws. A type of screw that probably would provide a solution to this problem by increasing the range between drive torque and strip torque, making it more difficult to strip the screw with the torque required to drive it into the panels being joined together.

One such attempt is disclosed in U.S. Pat. No. 5,183,359, issued to Barth on Feb. 2, 1993. Barth discloses a head 20a and a threaded shank 10a, and the head 20a has a clamping face 210a which include s a number of polyhedral nibs 23a extending axially therefrom and separated from one another by substantially planar uninterrupted portions of the clamping face 210a. The nibs 23a include a leading wall 233a and a trailing wall 235a, facing in the direction of tightening and opposite thereto, respectively. The leading wall 233a may be inclined at a steeper angle with respect to the plane of the clamping face 210a than is the trailing wall 235a, or vice versa. The leading wall 233a and trailing wall 235a meet to form an apex 231a which is also inclined with respect to the plane of the clamping face 210a, so that the nibs 23a increase in axial height as one views outward toward the periphery of the clamping face 210a. And the trailing wall 235a angle may be greater than the leading wall angle 231a may still inhibit further tightening of the fastener member, while the trailing wall 235a may resist backout due to vibration, as shown in FIGS. 1A and 1B.

Unfortunately, the direction of vibration cannot be predetermined. The trailing walls 235a of the nibs 23a are designated for absorbing one-way vibrational torque only. Therefore, this type of fastener cannot be used in a nondirective high frequency vibration environment.

SUMMARY OF THE INVENTION

It is a major object of the invention to provide a plurality of relatively small integral tapered angle blocks on the underside of the head, spaced from one another by substantially planar uninterrupted portions of head and projecting axially therefrom for engaging a workpiece.

Another object of the invention is to overcome the directional instability in a high frequency vibration environment by using the tapered angle block to absorb in any direction.

The present invention is directed to a sheet metal screw for attaching two thin panels together, an anti-loosening fastener for joining metal panels. It comprises a head having an upper side and underside; a shank having threads throughout the entire length thereof, the shank being attached to the underside of the head; and a plurality of relatively small integral tapered angle blocks on the underside of head, spaced from one another by substantially planar uninterrupted portions of said head and projecting axially therefrom for engaging a workpiece. Furthermore, each tapered angle block has an incision therefrom, which defines an angle from the periphery of said tapered angle block cutting to the vertex, and set on whose clockwise direction by substantially planar uninterrupted portions of said head and projecting axially therefrom.

These and other objects and advantages of the invention, as well as the details of an illustrative embodiment, will be more fully understood from the following description and drawings, in which:

DESCRIPTION OF THE PREFERRED EMBODIMENT

Figure 1A:
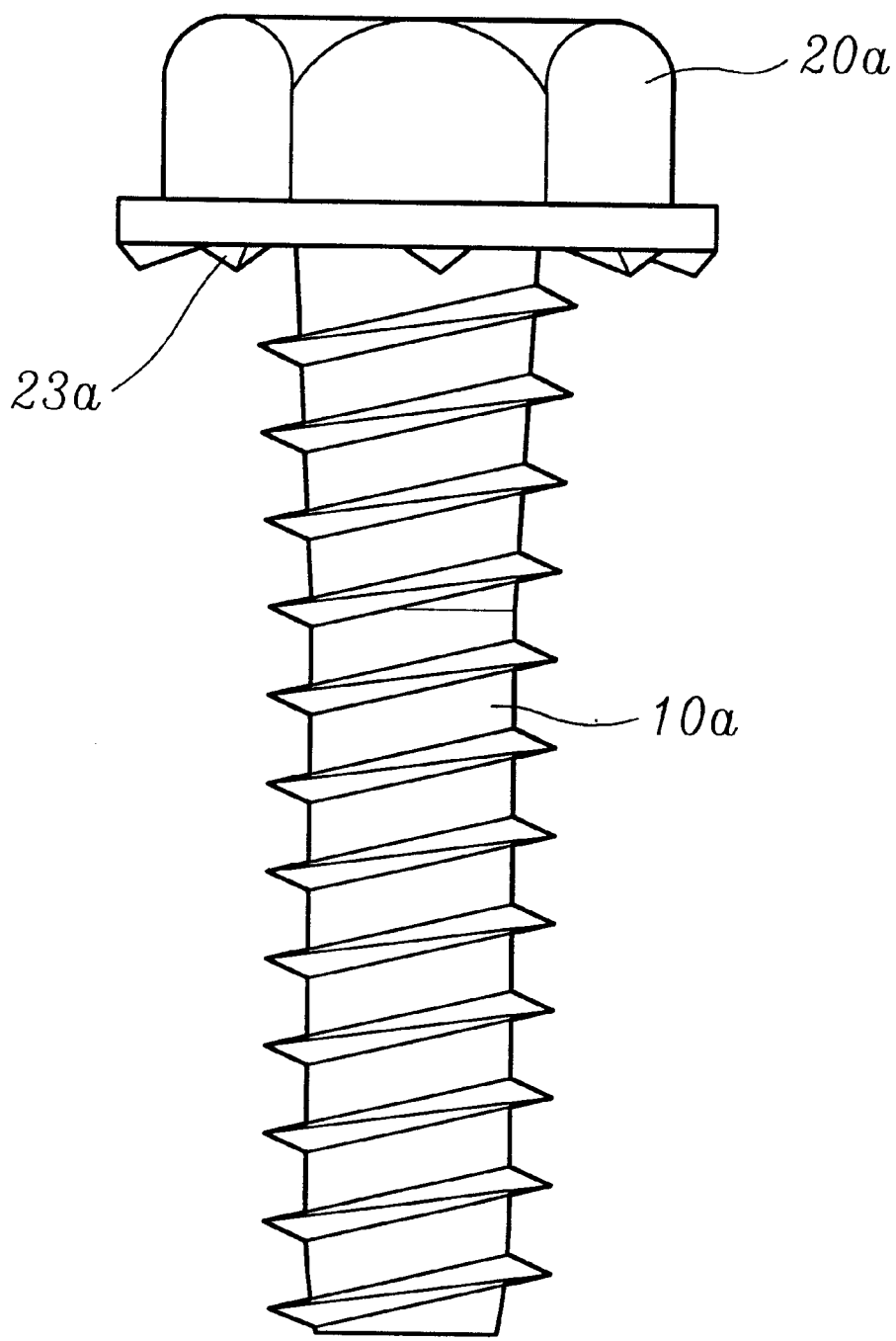
FIG. 1A is a side elevation view of a prior art fastener.
Figure 1B:
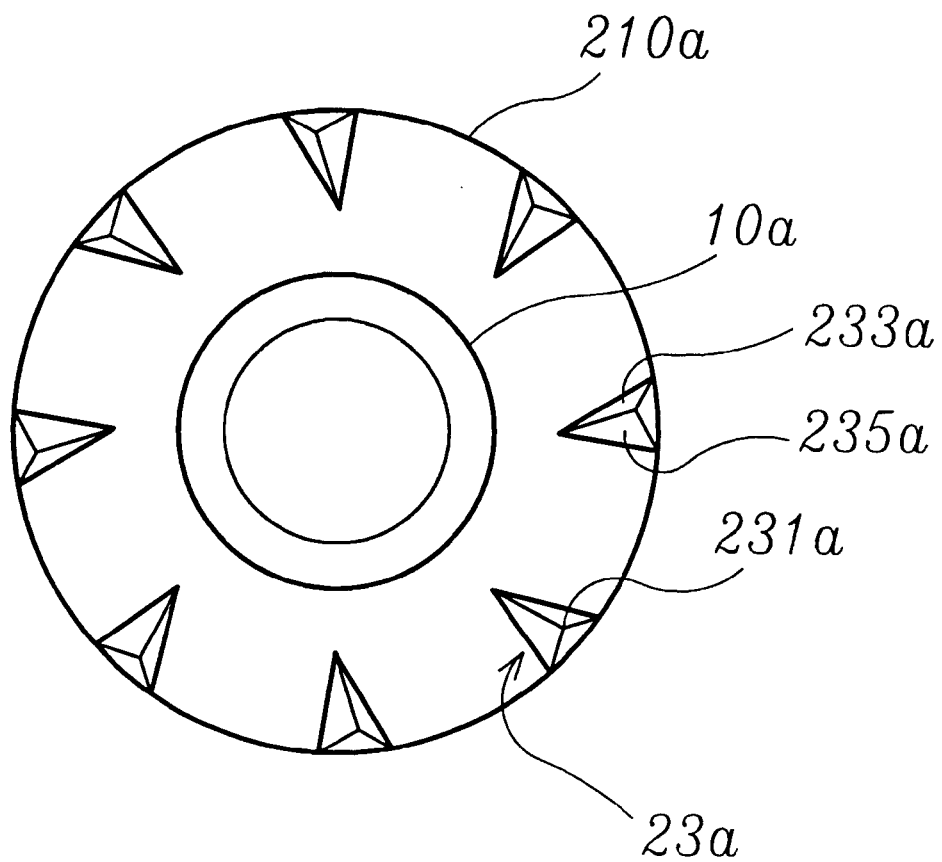
FIG. 1B is a plan view of the underside of the prior art fastener.
Figure 2:
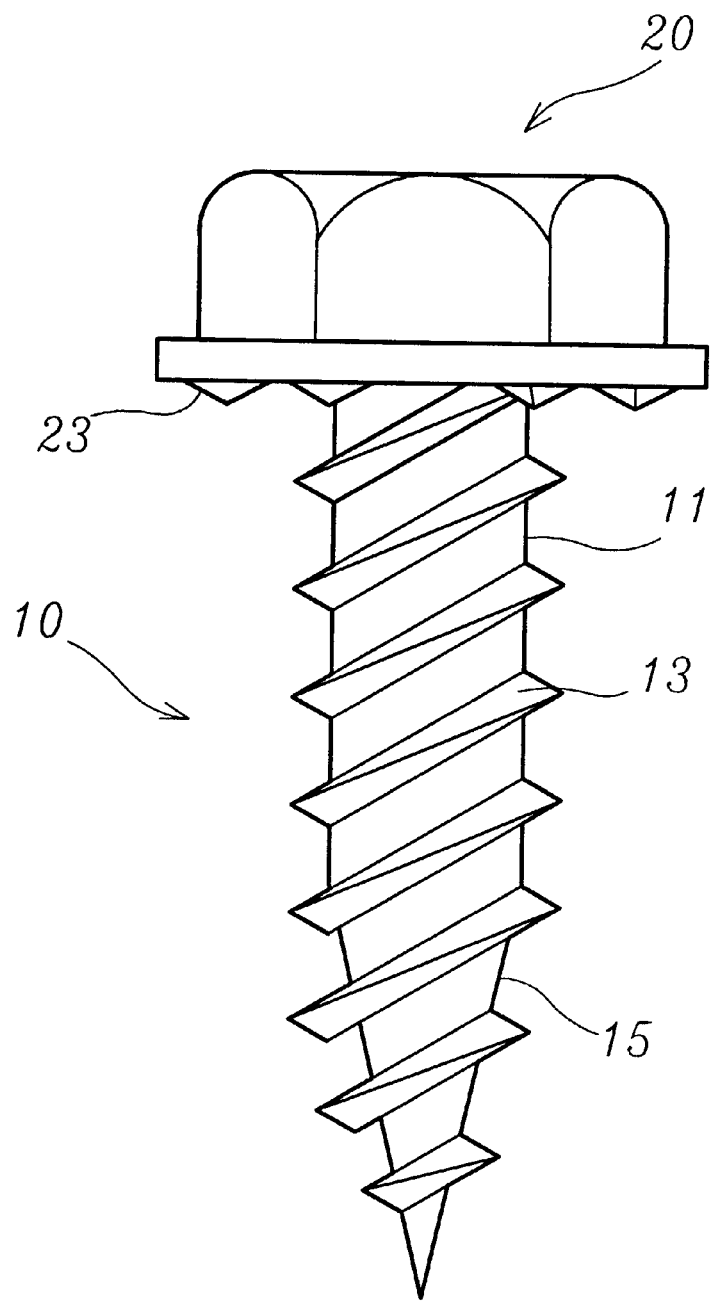
FIG. 2 is a side elevation view of the anti-loosening fastener of the present invention.
Figure 3:
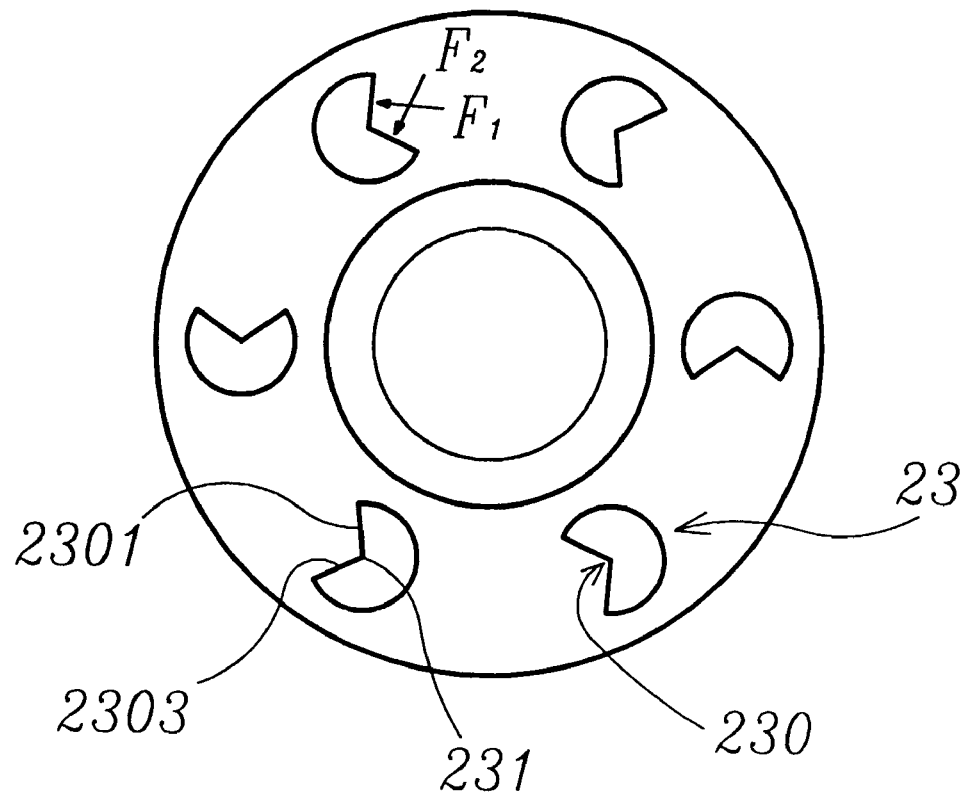
FIG. 3 is a plan view of the underside of the present invention.

With reference now to FIG. 2 and FIG. 3 the anti-loosening fastener of the present invention is shown. The fastener includes a head 20 having an upper side and an underside. A shank 10 having threads 13 throughout the entire length thereof is attached to the underside of head 20. A plurality of relatively small integral tapered angle blocks 23 on the underside of the head and spaced from one another by substantially planar uninterrupted portions of head 10, and each projects axially therefrom for engaging a workpiece. Generally, the shank has a first shaft section 11 integral with a second, substantially tapered, section 15.

Figure 4:
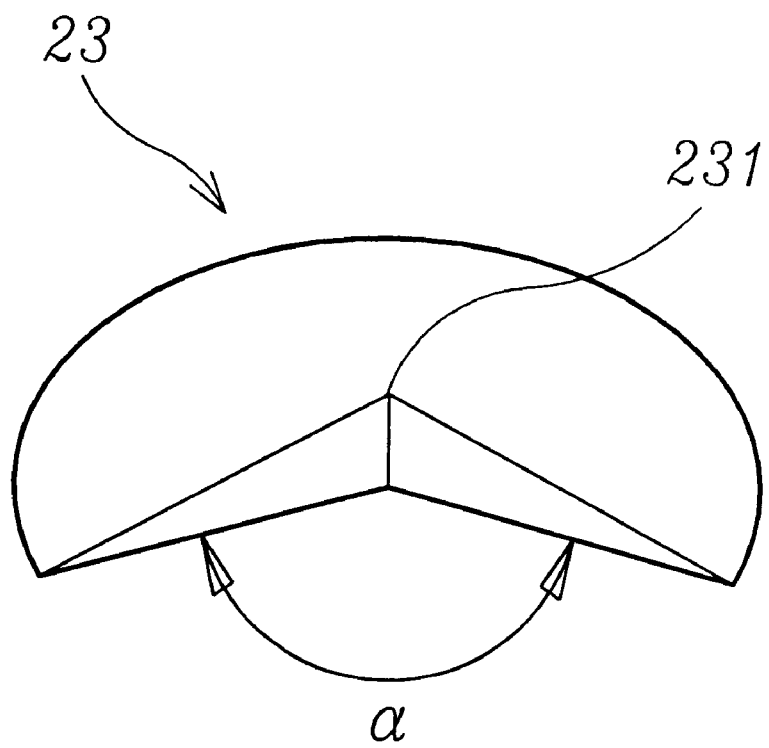
FIG. 4 is an illustration of the tapered angle block according to a preferred embodiment of the present invention.

Each tapered angle block 23 defines a vertex 231 and two side walls 2301 and 2303, and has an incision 230 therefrom, which defines an angle from the periphery of said tapered angle block cutting to said vertex 231, between the two side walls 2301 and 2303. The angle between the side walls is 110 degrees, as shown in FIG. 4. Furthermore, the incisions 230 of tapered angle blocks 23 are arranged in a clockwise direction with substantially planar uninterrupted portions of head 20 therebetween, with the angle blocks projecting axially from the planar portions. The side wall 2301 of the tapered angle block 23 is set in a direction tangent to the shank 10 that extends axially from the underside of the head 20.

Thus, during tightening, the vertices 231 of the tapered angle blocks 23 projecting axially from underside of the head 20 engage a workpiece. In the meanwhile, the side walls 2301 and 2303 of the incisions 230 generate two counter stresses $F_1$ and $F_2$, which can absorb torque from any direction. Therefore, the fastener is suitable for working in a high frequency vibration environment with directional instability and won't loosen.

Figure 5:
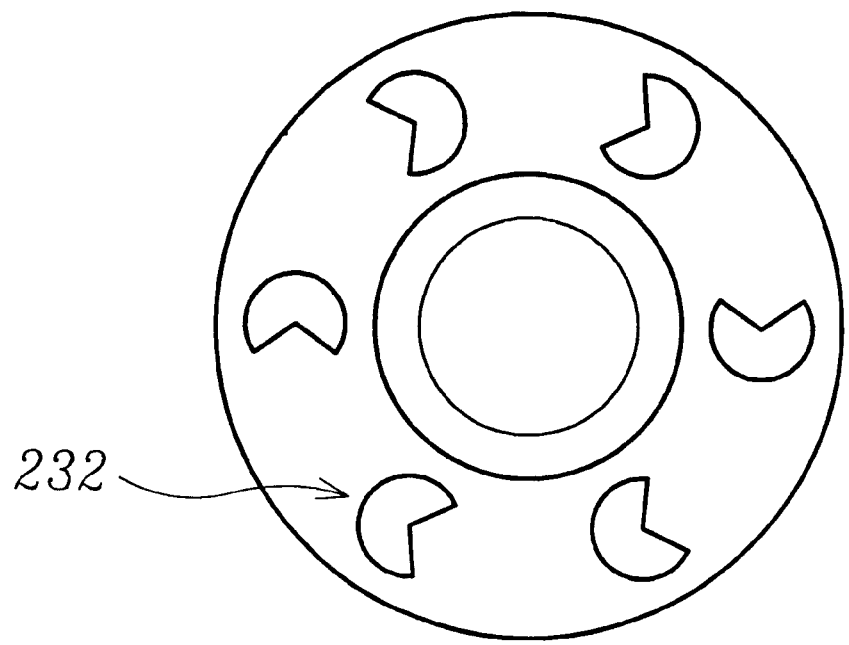
FIG. 5 is a plan view of he underside of the fastener according to another preferred embodiment of the present invention.

Referring now to FIG. 5, another arrangement of tapered blocks is shown. The incisions 232 of tapered angle blocks 23 are arranged in a counter clockwise direction with substantially planar uninterrupted portions of head 20 therebetween, with the angle blocks projecting axially from the planar portions. That arrangement has a different function from the clockwise arrangement previously discussed. The former serves an anti-loosening function, while the latter serves an anti-tightening function.

Whether the present invention is used for anti-loosening or anti-tightening, the tapered angle blocks 23, in addition to increasing the strip torque, will also bit through paint or other insulating materials on a thin metal panel to provide an electrical round, where such may be required.

What is claimed is:

1. An anti-loosening fastener for joining metal panels, comprising:

a head having an upper side and an underside;

a shank extending from said underside of said head and having threads formed throughout an entire length thereof; and a plurality of relatively small tapered angle blocks integrally formed on said underside of said head spaced from one another by substantially planar uninterrupted portions of said head, said tapered angle blocks projecting axially from said underside of said head for engaging a workpiece, each said tapered angle block having an incision defining a pair of side walls disposed in angular relationship one with respect to the other, said side walls being joined at a vertex of said angle block.

2. The anti-loosening fastener for joining metal panels as claimed in claim 1, wherein said incisions of tapered angle blocks each have an orientation that is angularly offset with respect to an adjacent tapered angle block, said angular offset of said incisions being in a clockwise direction.

3. The anti-loosening fastener for joining metal panels as claimed in claim 1, wherein said incisions of tapered angle blocks each have an orientation that is angularly offset with respect to an adjacent tapered angle block, said angular offset of said incisions being in a counter clockwise direction.

4. The anti-loosening fastener for joining metal panels as claimed in claim 1, wherein said pair of side walls are angularly disposed at an angle approximating 110 degrees.

* * * * *